US012780103B2

(12) United States Patent
Kato

(10) Patent No.: US 12,780,103 B2
(45) Date of Patent: Nov. 3, 2026

(54) TERMINAL-EQUIPPED DAMPER DEVICE

(71) Applicant: PIOLAX, INC., Kanagawa (JP)

(72) Inventor: Kouichi Kato, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 416 days.

(21) Appl. No.: 18/703,949

(22) PCT Filed: Oct. 20, 2022

(86) PCT No.: PCT/JP2022/039175
§ 371 (c)(1),
(2) Date: May 24, 2024

(87) PCT Pub. No.: WO2023/074537
PCT Pub. Date: May 4, 2023

(65) Prior Publication Data

US 2024/0424994 A1 Dec. 26, 2024

(30) Foreign Application Priority Data

Oct. 26, 2021 (JP) ................................ 2021-174976

(51) Int. Cl.
*B60R 7/06* (2006.01)
*F16F 7/00* (2006.01)

(52) U.S. Cl.
CPC .................. *B60R 7/06* (2013.01); *F16F 7/00* (2013.01); *F16F 2222/04* (2013.01);
(Continued)

(58) Field of Classification Search
CPC . B60R 7/06; F16F 7/00; F16F 2222/04; F16F 2222/126; F16F 2232/02; F16F 2232/08
(Continued)

(56) References Cited

U.S. PATENT DOCUMENTS 6,298,959 B1 10/2001 Willner et al.
2007/0187195 A1 8/2007 Park
(Continued)

FOREIGN PATENT DOCUMENTS

JP 2009-184466 A 8/2009
JP 2011-178296 A 9/2011
(Continued)

OTHER PUBLICATIONS

Dec. 6, 2022, International Search Report issued for related PCT Application No. PCT/JP2022/039175.
(Continued)

*Primary Examiner* — Christopher P Schwartz
(74) *Attorney, Agent, or Firm* — Paratus Law Group, PLLC

(57) ABSTRACT

A terminal-equipped damper device includes: a case; a rod; and a damper structure. The rod includes a pressing portion that is configured to press a first terminal and configured to bring the first terminal into contact with a second terminal depending on a slide position of the rod. The first terminal includes a first extending portion extending in a sliding direction of the rod, a first contact portion, and a receiving portion configured to be pressed by the pressing portion, and the first terminal is disposed outside the case. The second terminal includes a second extending portion extending in the sliding direction of the rod, and a second contact portion, and the second terminal is disposed outside the case and disposed to face the first terminal.

6 Claims, 13 Drawing Sheets

(52) U.S. Cl.
CPC ..... *F16F 2222/126* (2013.01); *F16F 2232/02* (2013.01); *F16F 2232/08* (2013.01)

(58) Field of Classification Search
USPC ........................................ 188/271, 272, 281
See application file for complete search history.

(56) References Cited

U.S. PATENT DOCUMENTS

| | | | | |
|---|---|---|---|---|
| 2008/0121501 | A1* | 5/2008 | Ahn | H01H 3/161<br>200/61.81 |
| 2012/0175204 | A1* | 7/2012 | Arnold | F16F 9/12<br>188/271 |
| 2019/0161019 | A1* | 5/2019 | Bivens | B60Q 3/225 |
| 2024/0337302 | A1* | 10/2024 | Beck | F16F 7/00 |

FOREIGN PATENT DOCUMENTS

| | | | |
|---|---|---|---|
| KR | 10-2008-0082766 | A | 9/2008 |
| WO | WO 2007/080448 | A1 | 7/2007 |
| WO | WO 2019/198423 | A1 | 10/2019 |
| WO | WO 2020/241518 | A1 | 12/2020 |

OTHER PUBLICATIONS

Dec. 6, 2022, International Search Opinion issued for related PCT Application No. PCT/JP2022/039175.

* cited by examiner

TERMINAL-EQUIPPED DAMPER DEVICE

CROSS REFERENCE TO PRIOR APPLICATION

This application is a National Stage Patent Application of PCT International Patent Application No. PCT/JP2022/039175 (filed on Oct. 20, 2022) under 35 U.S.C. § 371, which claims priority to Japanese Patent Application No. 2021-174976 (filed on Oct. 26, 2021), which are all hereby incorporated by reference in their entirety.

TECHNICAL FIELD

The present invention relates to a terminal-equipped damper device that is used for braking, for example, an opening and closing operation of a glove box of an automobile and that includes terminals that are brought into contact with and electrically connected to each other when a predetermined operation is performed.

BACKGROUND ART

A damper device may be used in, for example, a glove box of an automobile to suppress a lid from being rapidly opened and allow the lid to be gently opened. The damper device includes, for example, a pair of terminals for turning on a light when the glove box is opened.

As such a damper device, the following Patent Literature 1 describes a damper device including a housing and a piston rod slidably held by the housing, in which a contact carrier is provided to protrude in a radially outward direction from an outer periphery of the housing (see FIG. 4 in Patent Literature 1), and a pair of contact tongues are disposed on the contact carrier.

CITATION LIST

Patent Literature

Patent Literature 1: U.S. Pat. No. 6,298,959B1

SUMMARY OF INVENTION

Technical Problem

In the case of the damper device described in Patent Literature 1, since the contact carrier protrudes from the outer periphery of the housing in the radially outward direction (a direction intersecting with a sliding direction of the piston rod and facing outward of the housing) and the pair of contact tongues are disposed on the contact carrier, there is a problem that the entire damper device is increased in size in the radially outward direction.

In view of the above, an object of the present invention is to provide a terminal-equipped damper device that can be made compact in a direction intersecting with a sliding direction of a rod and facing outward of a case.

Solution to Problem

In order to achieve the above object, the present invention provides a terminal-equipped damper device having a first terminal and a second terminal that are configured to approach or separate from each other. The terminal-equipped damper device includes: a case; a rod slidably held by the case, and a damper structure configured to apply a braking force to the rod, and the rod includes a pressing portion that is configured to press the first terminal and configured to bring the first terminal into contact with the second terminal depending on a slide position of the rod. The first terminal includes a first extending portion having a base end supported by the case and extending in a sliding direction of the rod, a first contact portion provided on a distal end portion side of the first extending portion, and a receiving portion configured to be pressed by the pressing portion, and the first terminal is disposed outside the case. The second terminal includes a second extending portion having a base end supported by the case and extending in the sliding direction of the rod, and a second contact portion provided on a distal end portion side of the second extending portion and coming into contact with the first contact portion when the receiving portion is pressed by the pressing portion, and the second terminal is disposed outside the case and disposed to face the first terminal.

Advantageous Effects of Invention

According to the present invention, since a first extending portion of a first terminal and a second extending portion of a second terminal extend in a sliding direction of a rod, a damper device can be suppressed from being bulky in a direction intersecting with the sliding direction of the rod and facing outward of the case, and the damper device can be made compact.

DESCRIPTION OF EMBODIMENTS (Embodiment of Terminal-Equipped Damper Device)

Hereinafter, a terminal-equipped damper device according to an embodiment of the present disclosure will be described with reference to the drawings.

Figure 1:
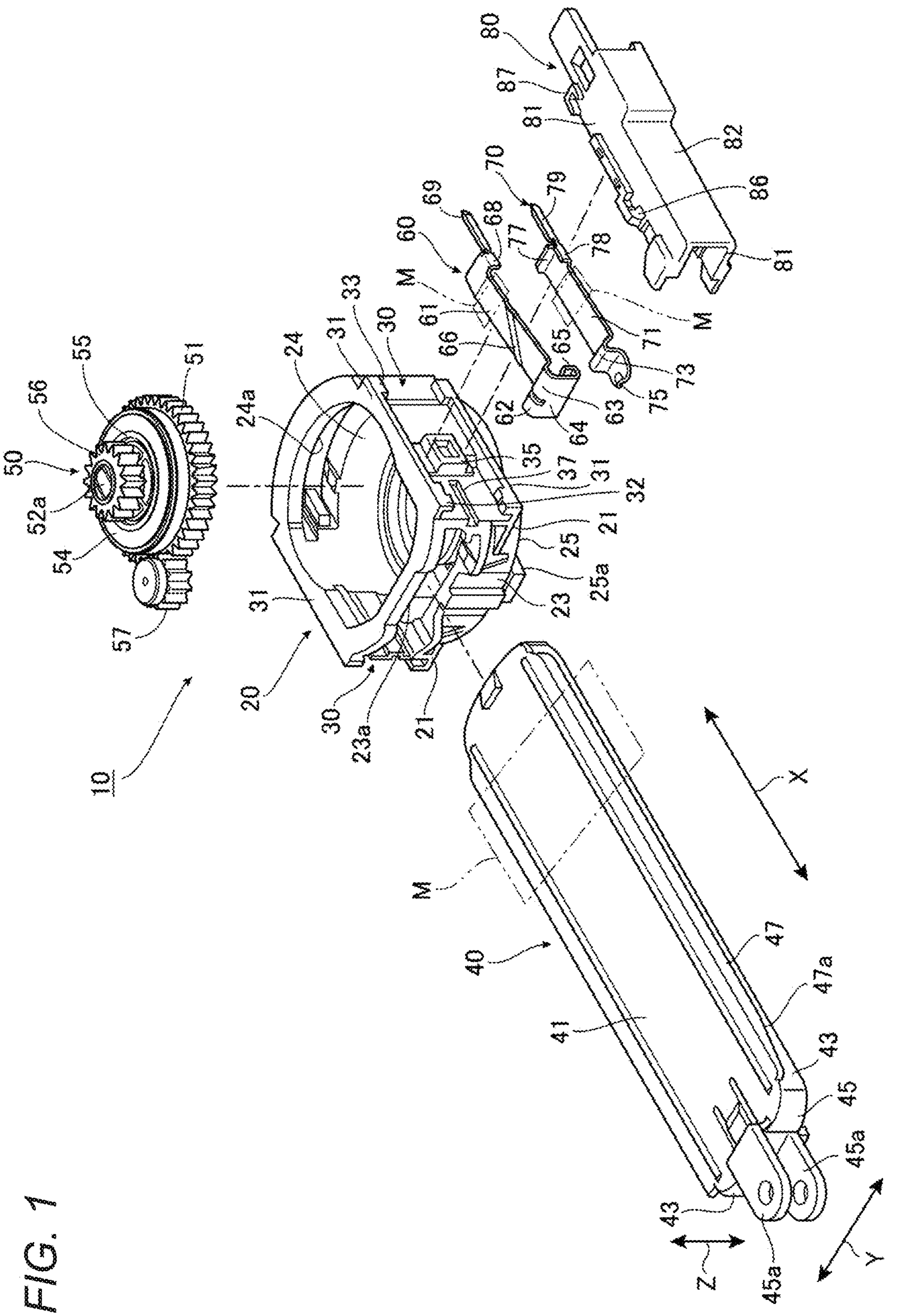
FIG. 1 is an exploded perspective view showing an embodiment of a terminal-equipped damper device according to the present invention.
Figure 12:
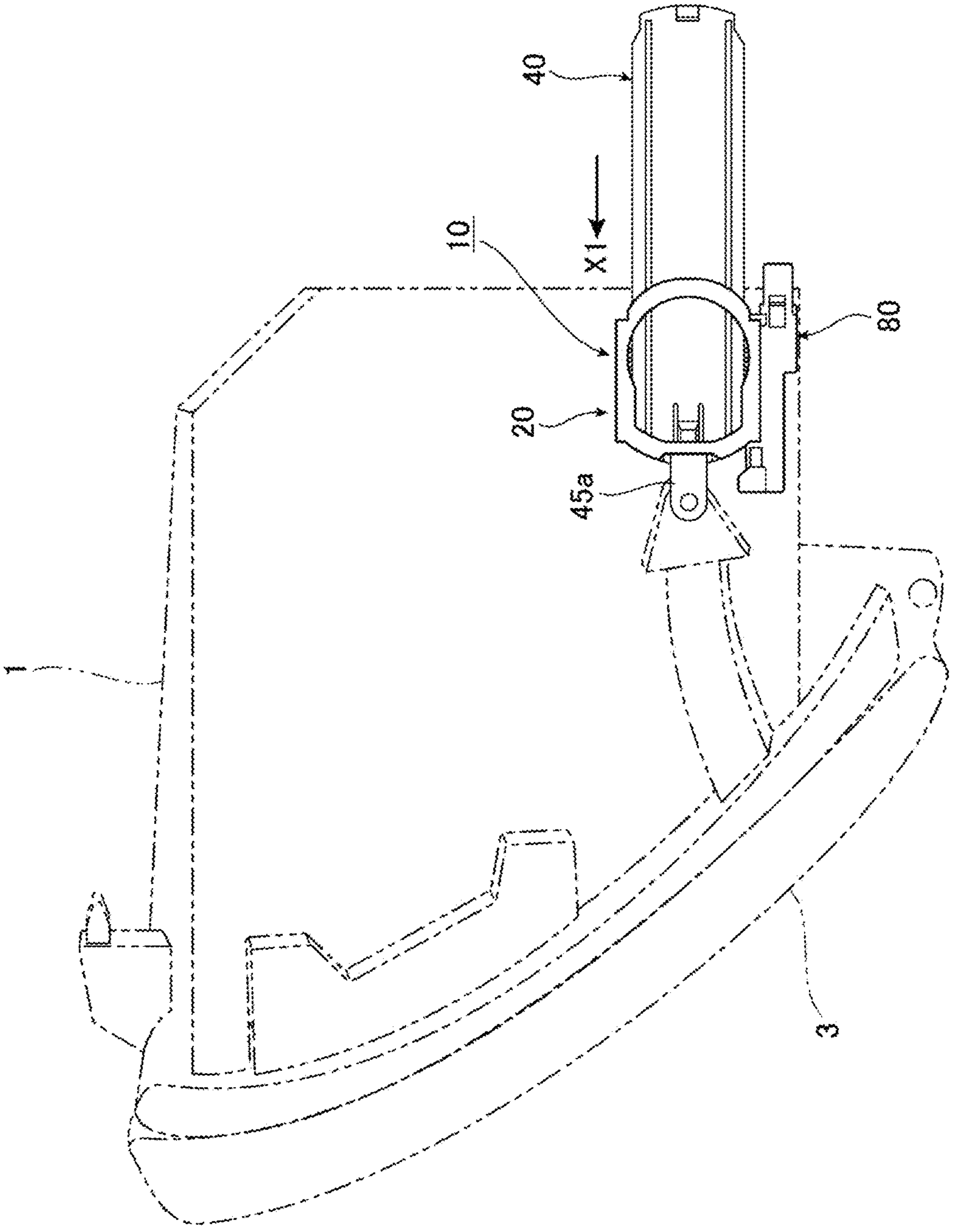
FIG. 12 is a view illustrating a state where an opening and closing body closes an opening of a fixing body.
Figure 13:
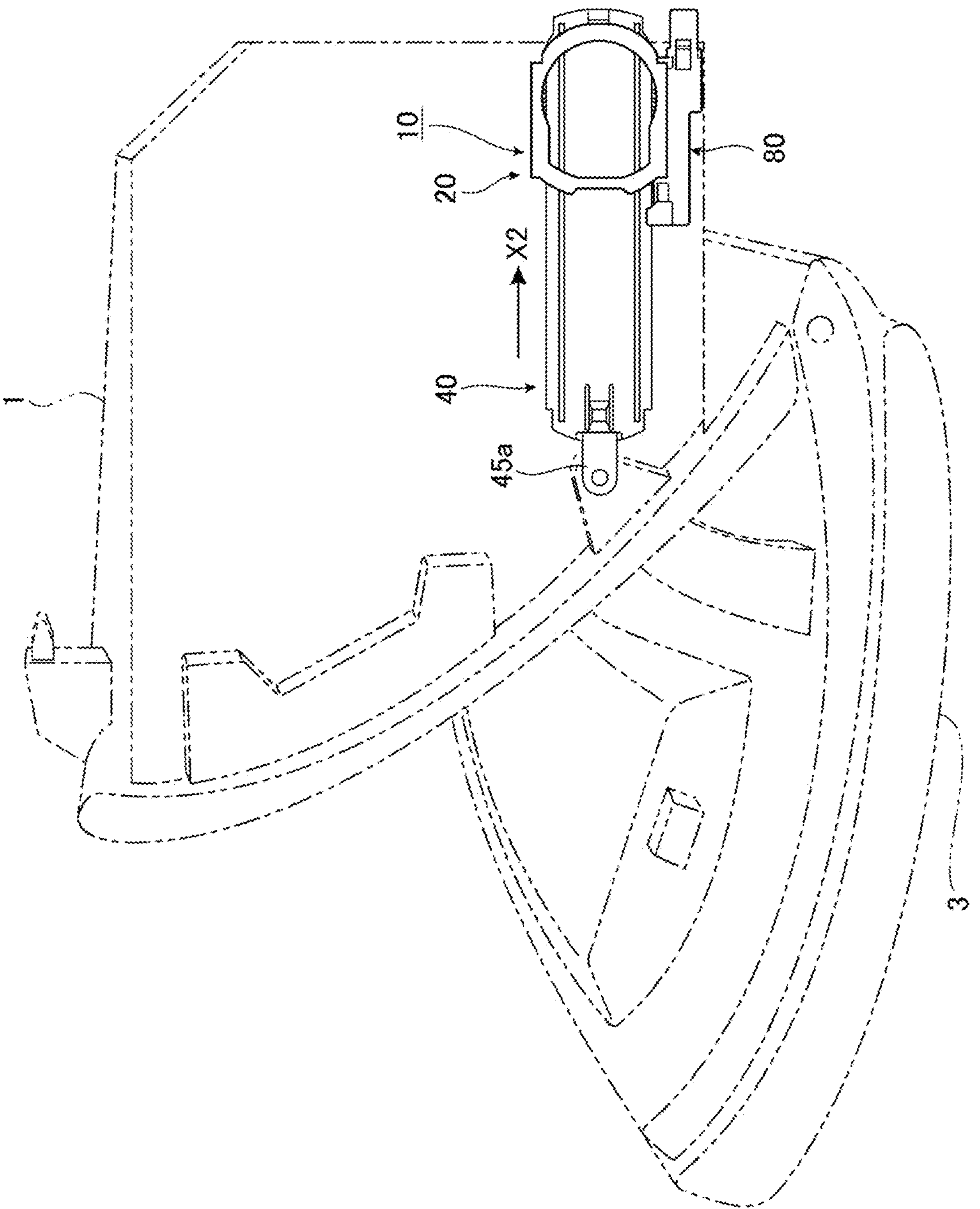
FIG. 13 is a view illustrating a state where the opening and closing body is opened from the opening of the fixing body.

As shown in FIG. 1, a terminal-equipped damper device 10 (hereinafter, also simply referred to as a "damper device 10") includes a first terminal 60, and a second terminal 70 that approach or separate from each other. As shown in FIGS. 12 and 13, the terminal-equipped damper device 10 is attached to a pair of members that approach or separate from each other, and applies a braking force when the pair of members approach or separate from each other. For example, the terminal-equipped damper device 10 is used for braking a glove box, a lid, or the like attached to an opening of an accommodation portion in an instrument panel of an automobile to be openable and closable.

In the following embodiment, the one member is described as the fixing body 1 such as the accommodation portion of the instrument panel, and another member is described as the opening and closing body 3 such as a glove box or a lid attached to an opening of the fixing body to be openable and closable. Alternatively, the present invention is not limited thereto as long as the pair of members can approach or separate from each other. In addition, in this embodiment, a pair of terminals 60, 70 are switch terminals used to turn on a light (not shown) disposed in the fixing body 1 (here, in the glove box) when the opening and closing body 3 is opened, and when the opening and closing body 3 is opened from the opening of the fixing body 1, both the two terminals 60, 70 are brought into contact with each other to be electrically conducted, and the light is turned on. However, the first terminal and the second terminal may be used other than a switch terminal for turning on a light, and are not particularly limited.

As shown in FIG. 1, the damper device 10 according to this embodiment includes the first terminal 60 and the second terminal 70 that approach or separate from each other, and includes a main body case 20 (serving as a "case" in the present invention), a rod 40 slidably held by the main body case 20, and a damper structure that applies a braking force to the rod 40. In this embodiment, a damper structure body 50 including a plurality of gears and the like and a rack gear 43*a* (see FIG. 5) provided on the rod 40 form a "damper structure" according to the present invention. Further, the damper device 10 includes a terminal case 80 that is mounted outside the main body case 20 and that accommodates and holds the pair of terminals 60 and 70.

In the following description, a sliding direction of the rod 40 with respect to the main body case 20 is referred to as a direction "X", one direction thereof is referred to as a direction "X1", and another direction thereof is referred to as a direction "X2" (see FIGS. 1 and 2). A direction orthogonal to the sliding direction X of the rod 40 is referred to as a "width direction Y", and a direction orthogonal to the sliding direction X and the width direction Y is referred to as a "height direction Z" (see FIGS. 1 and 2).

First, the main body case 20 will be described.

As shown in FIG. 1, the main body case 20 according to this embodiment includes a pair of side walls 21, 21 extending in a predetermined length and disposed parallel to each other, a pair of connection walls 23, 24 connecting both ends in a longitudinal direction of the pair of side walls 21, 21, and a bottom wall 25 provided on a bottom side of the side walls 21, 21 and the connection walls 23, 24, and a ceiling side opposite to the bottom wall 25 is opened to form a thin case (thin box shape).

Figure 4:
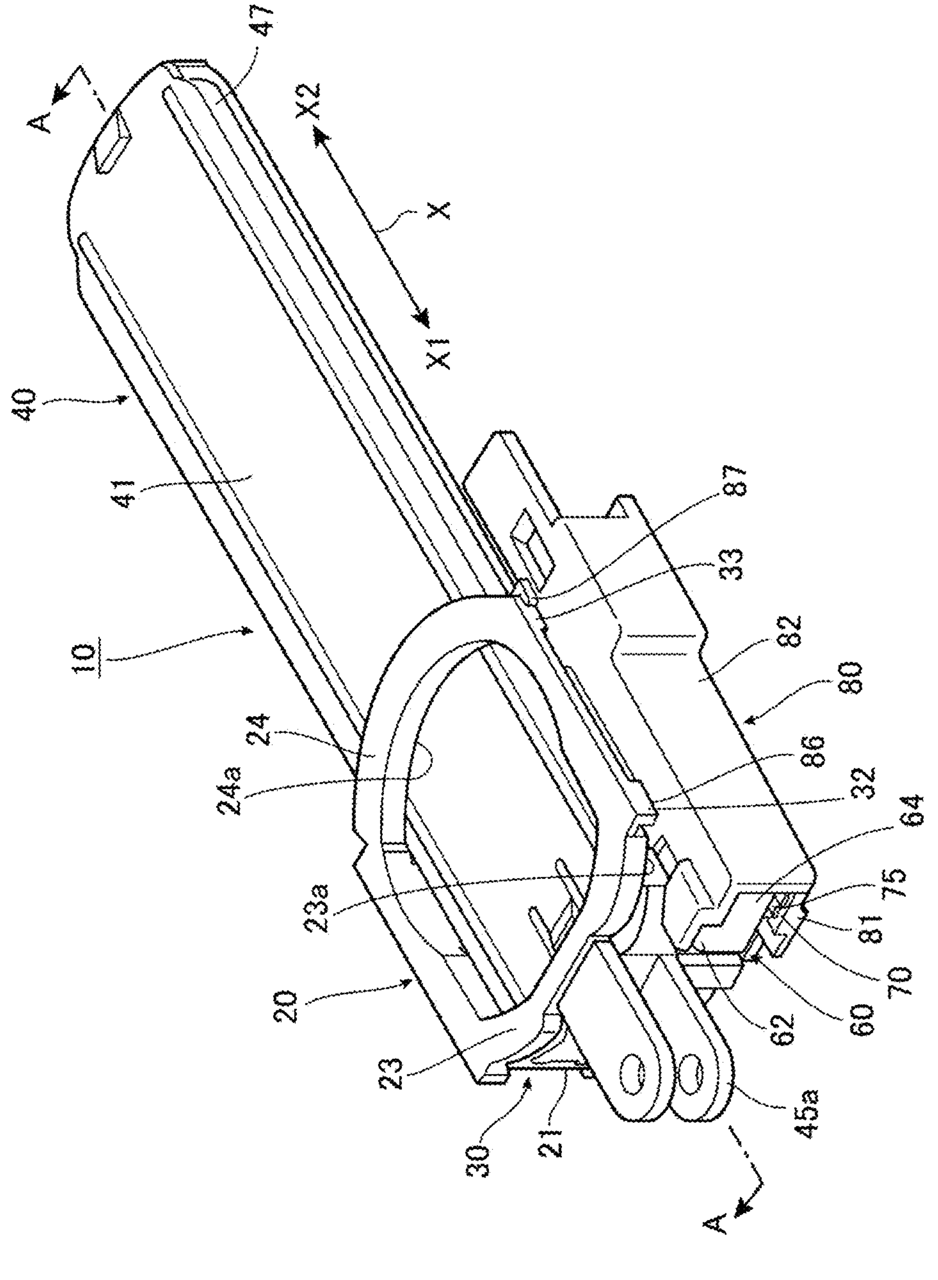
FIG. 4 is a perspective view of the terminal-equipped damper device.
Figure 5:
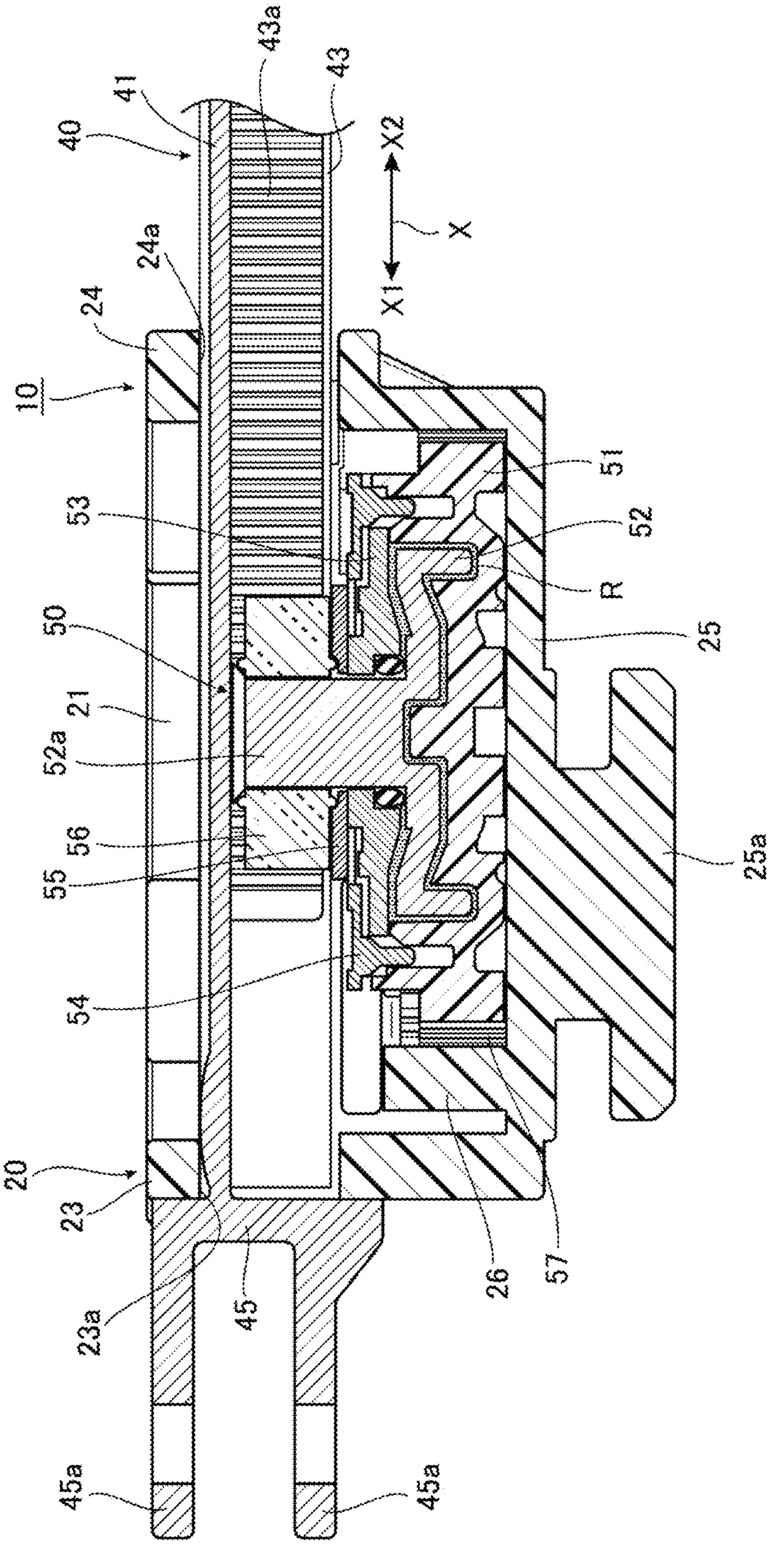
FIG. 5 is a cross-sectional view taken along a line A-A in FIG. 4.

On one end portion side of the pair of connection walls 23, 24 in the height direction Z, slots 23*a*, 24*a* are formed to penetrate the connection walls 23, 24 and slidably hold the rod 40 with respect to the main body case 20. In this way, the main body case 20 has a shape in which the slots 23*a*, 24*a* open in both directions X1, X2 in the sliding direction X of the rod 40 are provided. As shown in FIGS. 4 and 5, the rod 40 is inserted into the slots 23*a*, 24*a* of the pair of connection walls 23, 24, and is held to be slidable in the X1 direction shown in FIG. 12 and the X2 direction shown in FIG. 13.

Figure 6:
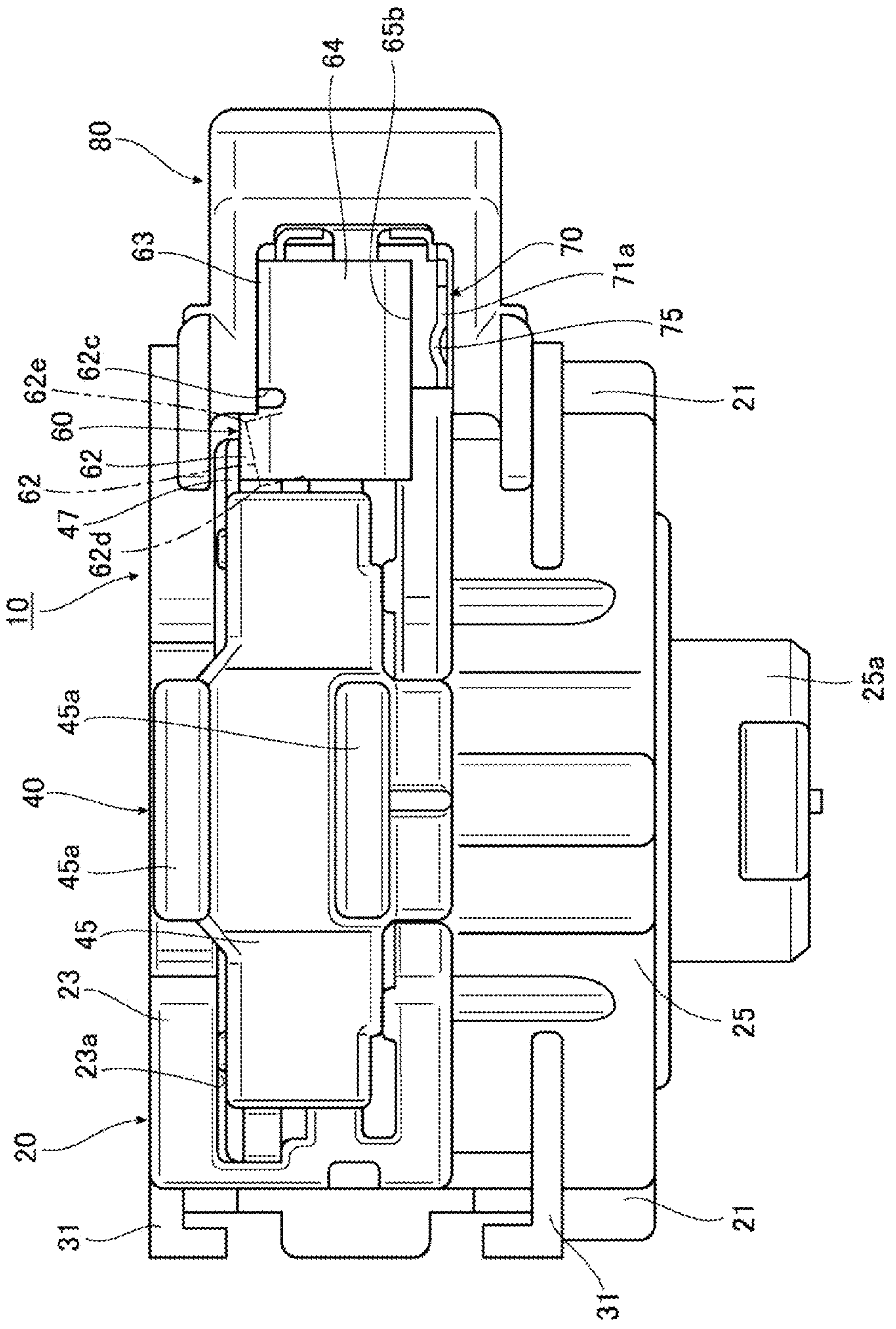
FIG. 6 is a front view of the terminal-equipped damper device.

Further, as shown in FIGS. 5 and 6, an attachment portion 25*a* protrudes from an outside of the bottom wall 25. The entire damper device 10 is attached to the fixing body 1, which is one member, via the attachment portion 25*a*. A rotation restricting portion 26 (see FIG. 5) is provided inside the main body case 20 to restrict rotation of a planetary gear 57 (see FIG. 1) constituting the damper structure body 50 when the planetary gear 57 is rotated in a predetermined direction.

Further, as shown in FIG. 1, a terminal case mounting portion 30 for mounting the terminal case 80 is provided outside each side wall 21.

Specifically, a pair of pressing walls 31, 31 protrude from both end edge portions in the height direction Z (see FIG. 1) on outer surface sides of the side walls 21. The pair of pressing walls 31, 31 are disposed to face each other and extend along the longitudinal direction of the side walls 21 (the same direction as the sliding direction X of the rod 40). A first engaging portion 32 and a second engaging portion 33 each having a protruding shape protrude from an inner surface side (a facing surface side of the pressing wall 31 on another side) of one end portion in a longitudinal direction (an end portion on a sliding direction X1 side of the rod 40) and another end portion in the longitudinal direction (an end portion on a sliding direction X2 side of the rod 40) of one pressing wall 31 toward another pressing wall 31, respectively.

Further, a terminal engaging protrusion 35 having a rectangular protruding shape protrudes at an intermediate portion in the height direction Z between the first engaging portion 32 and the second engaging portion 33 on an outer surface of each side wall 21. A positioning groove 37 having a concave groove shape is formed in an intermediate portion of the outer surface of each side wall 21 in the height direction Z to have a length that does not reach the terminal engaging protrusion 35 from one end to another end in the longitudinal direction.

Next, the rod 40 will be described.

The rod 40 according to this embodiment includes a long plate-shaped substrate 41 extending by a predetermined length, a pair of side walls 43, 43 that are vertically provided from both side edges in the width direction Y orthogonal to a longitudinal direction of the substrate 41, and a distal end portion 45 that is disposed at one end portion in the longitudinal direction of the substrate 41 and both side walls 43 and that connects the substrate 41 and both side walls 43 to each other. The rod 40 has a thin flat shape as a whole. The rod 40 is inserted into the slots 23*a*, 24*a* of the main body case 20 and is slidably held by the main body case 20. At this time, the pair of side walls 43, 43 are disposed on both sides of the slots 23*a*, 24*a* in the width direction Y. As shown in FIG. 5, the rack gear 43*a* is formed on an inner surface of one side wall 43.

Further, a pair of mounting pieces 45*a*. 45*a* each having a tongue shape protrude from the distal end portion 45. The entire damper device 10 is attached to the opening and closing body 3, which is another member, via the pair of mounting pieces 45*a*. 45*a* (see FIGS. 12 and 13).

The rod 40 includes a pressing portion 47 that presses the first terminal 60 and brings the first terminal 60 into contact with the second terminal 70 depending on a slide position of the rod.

Figure 11A:
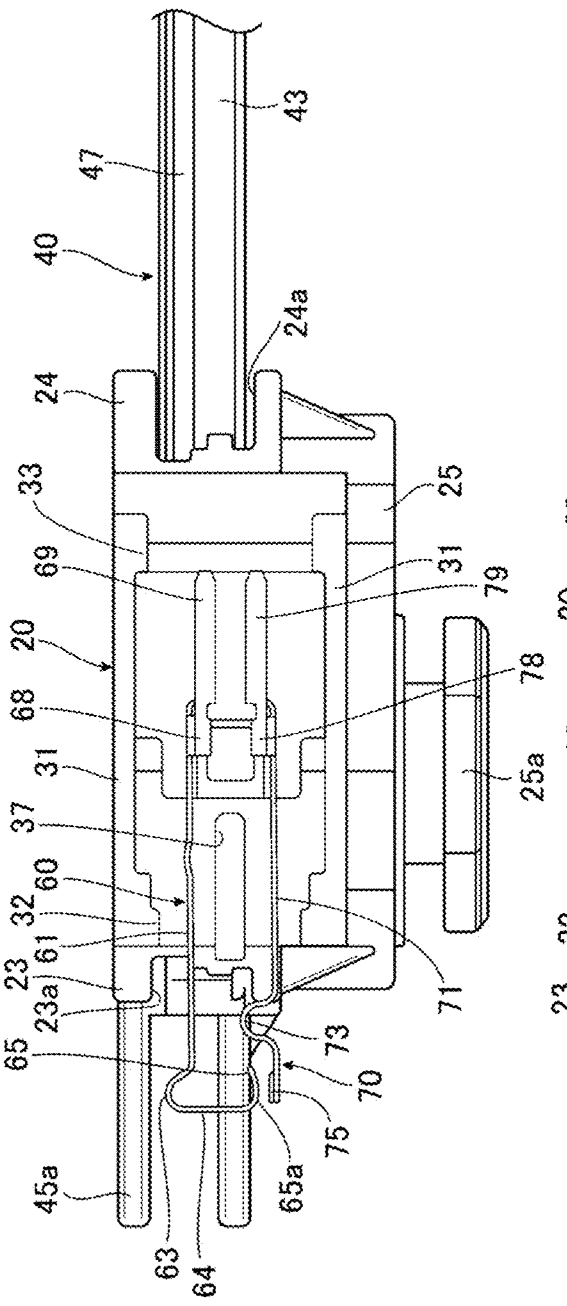
FIG. 11A shows an operation of the terminal-equipped damper device in the state where the terminal case is removed, which is a side view illustrating the state where the pressing portion of the rod does not press the receiving portion of the first terminal.
Figure 11B:
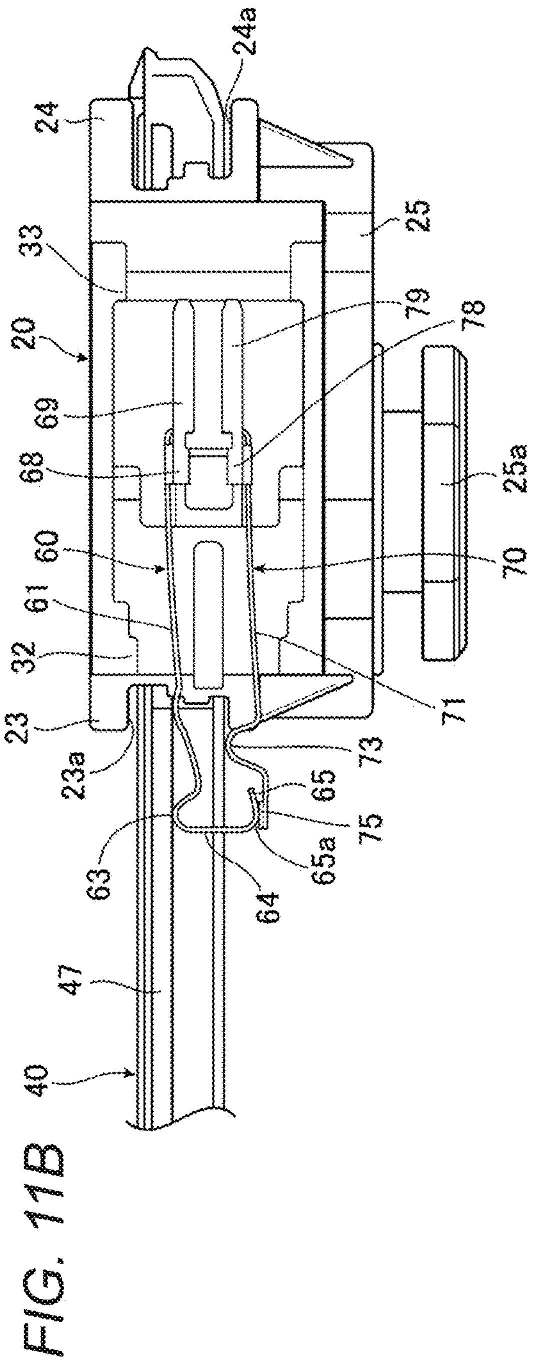
FIG. 11B shows an operation of the terminal-equipped damper device in the state where the terminal case is removed, which is a side view illustrating the state where the rod slides and the pressing portion of the rod presses the receiving portion of the first terminal.

As shown in FIGS. 1, 11A and 11B, in this embodiment, the pressing portion 47 in the form of a thin rib protrudes from one edge portion in the height direction Z on an outer surface side of each side wall 43. As shown in FIG. 1, the pressing portion 47 extends from one end portion side toward another end portion side in the longitudinal direction of the side wall 43 of the rod 40. The pressing portion 47 is aligned with a receiving portion 62 (see FIGS. 1 and 2) of the first terminal 60 in a state where the first terminal 60 is disposed outside the main body case 20, and the pressing portion 47 and the receiving portion 62 are disposed to face each other (see FIG. 6).

Figure 10A:
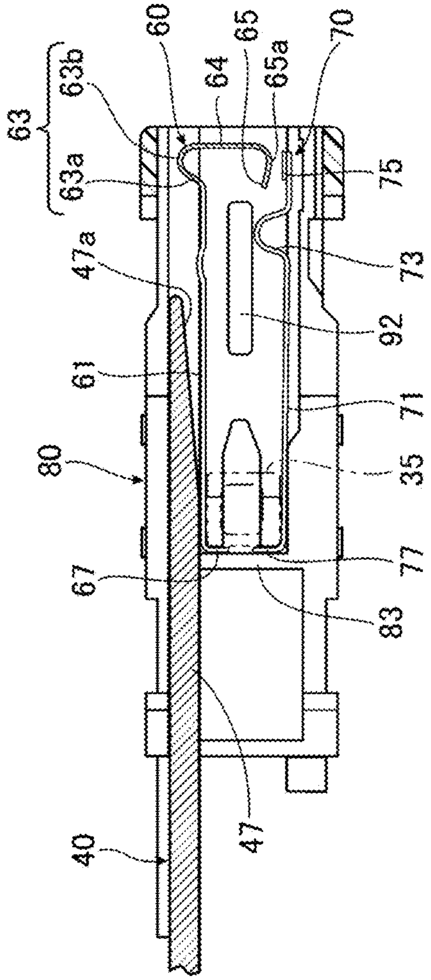
FIG. 10A shows an operation of the terminal-equipped damper device in a state where a main body case is removed, which is a cross-sectional view illustrating a state where a pressing portion of a rod does not press a receiving portion of a first terminal.
Figure 10B:
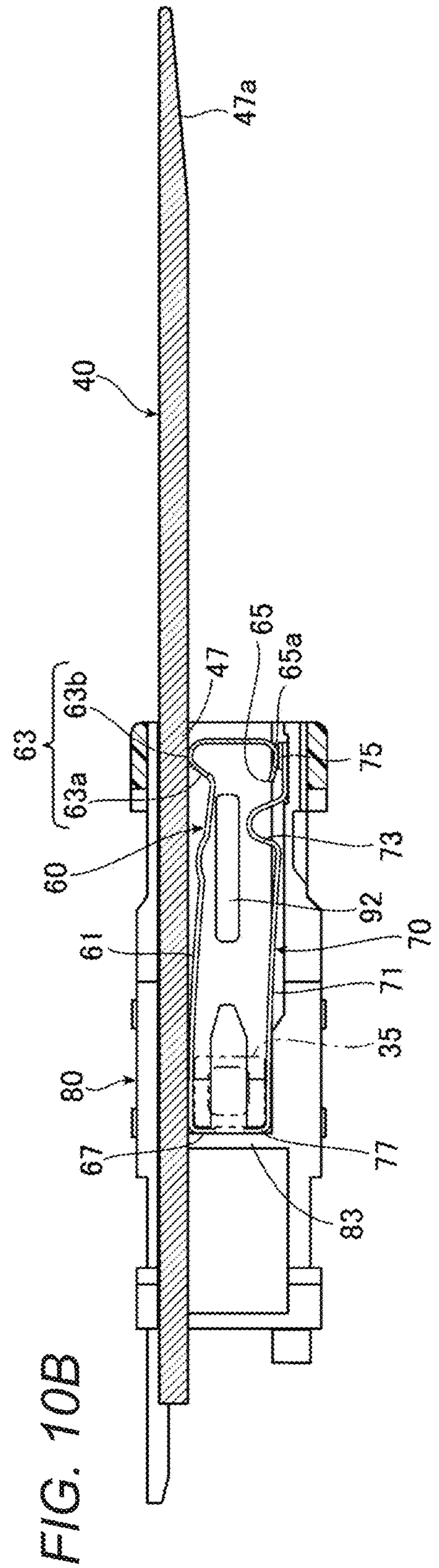
FIG. 10B shows an operation of the terminal-equipped damper device in a state where a main body case is removed, which is a cross-sectional view illustrating a state where the rod slides and the pressing portion of the rod presses the receiving portion of the first terminal.

As the rod 40 slides, the pressing portion 47 presses the receiving portion 62 of the first terminal 60 (although the receiving portion 62 is not shown in (b) of FIG. 10B and FIG. 11B, the receiving portion 62 located on a front side of the sheet of FIGS. 10A and 10B and the receiving portion 62 located on a back side of the sheet of FIGS. 11A and 11B are pressed by the pressing portion 47), thereby bringing a first contact portion of the first terminal 60 into contact with a second contact portion of the second terminal 70 (this will be described in detail in the description of the terminals 60, 70).

As shown in FIGS. 10A and 10B, a tapered surface 47*a* whose height decreases gradually toward a most distal end (a most distal end of the one end portion) in a longitudinal direction of the pressing portion 47 is formed on an inner surface side (a facing surface side of the first terminal 60) on one end portion in the longitudinal direction of the pressing portion 47 (an end portion on the sliding direction X1 side of the rod 40). The tapered surface 47*a* allows the pressing portion 47 to easily press the receiving portion 62 provided on the first terminal 60 (the tapered surface 47*a* allows the pressing portion 47 to gradually press the receiving portion 62 as the rod 40 slides).

Next, the damper structure body 50 will be described.

The damper structure body 50 basically has the same structure as a damper structure described in Japanese Patent Application No. 2019-099113 or Japanese Patent Application No. 2019-099441 filed by the applicant of the present invention. Therefore, the detail structure thereof will be omitted, however, the damper structure body 50 has roughly a following structure.

As shown in FIGS. 1 and 5, the damper structure body 50 includes a large-diameter gear 51 having a gear groove formed on an outer periphery of the damper structure body 50, a rotor 52 including a support shaft 52*a* rotatably disposed on an inner side of the rotor 52 via a viscous fluid R, a plurality of caps 53, 54, 55 that cover a surface side of the rotor 52 other than the support shaft 52*a* and that seal the viscous fluid R, a pinion gear 56 attached to a distal end portion of the support shaft 52*a* of the rotor 52 in a rotation-restricted state, and a planetary gear 57 disposed on an outer periphery of the large-diameter gear 51. The pinion gear 56 meshes with the rack gear 43*a* of the rod 40. Further, when the planetary gear 57 rotates in a predetermined direction, the planetary gear 57 engages with the rotation restricting portion 26 of the main body case 20 to restrict rotation of the planetary gear 57, and when the planetary gear 57 rotates in a direction opposite to the predetermined direction, the planetary gear 57 does not engage with the rotation restricting portion 26, and thus the rotation is allowed.

As shown in FIG. 12, when the rod 40 slides in the direction X1 (that is, when the rod 40 slides such that a protruding amount of the rod from the slot 23*a* of the connection wall 23 of the main body case 20 increases), the pinion gear 56 that meshes with the rack gear 43*a* rotates in a predetermined direction, the rotor 52 rotates in the same direction, and the large-diameter gear 51 also rotates in the same direction via the viscous fluid R. Therefore, although the planetary gear 57 meshing with the large-diameter gear 51 rotates in the same direction, the rotation is restricted by the rotation restricting portion 26, so that the rotation of the large-diameter gear 51 is stopped and only the rotor 52 rotates. As a result, a braking force is applied to the rotor 52 via the viscous fluid R, and a braking force is applied to the slide of the rod 40 in the direction X1.

On the other hand, as shown in FIG. 13, when the rod 40 slides in the direction X2 (that is, when the rod 40 slides such that the protruding amount of the rod from the connection wall 23 of the main body case 20 decreases and the rod 40 is drawn with respect to the slot 23*a*), the pinion gear 56 that meshes with the rack gear 43*a* rotates in a direction opposite to the above-described rotation direction (a rotation direction of the pinion gear 56 when the rod 40 slides in the direction X1). Thus, the rotor 52 rotates in the same direction, and the large-diameter gear 51 also rotates in the same direction via the viscous fluid R. Therefore, the planetary gear 57 that meshes with the large-diameter gear 51 rotates in the same direction, but at this time, the rotation of the planetary gear 57 is not restricted by the rotation restricting portion 26 and is allowed. As a result, since the large-diameter gear 51 also rotates together with the rotor 52, the braking force is not applied to the rotor 52 via the viscous fluid R, and the braking force is not applied to the slide of the rod 40 in the direction X2 (it can be said that the braking force applied to the rod 40 is released).

Next, the first terminal 60 will be described.

Figure 2:
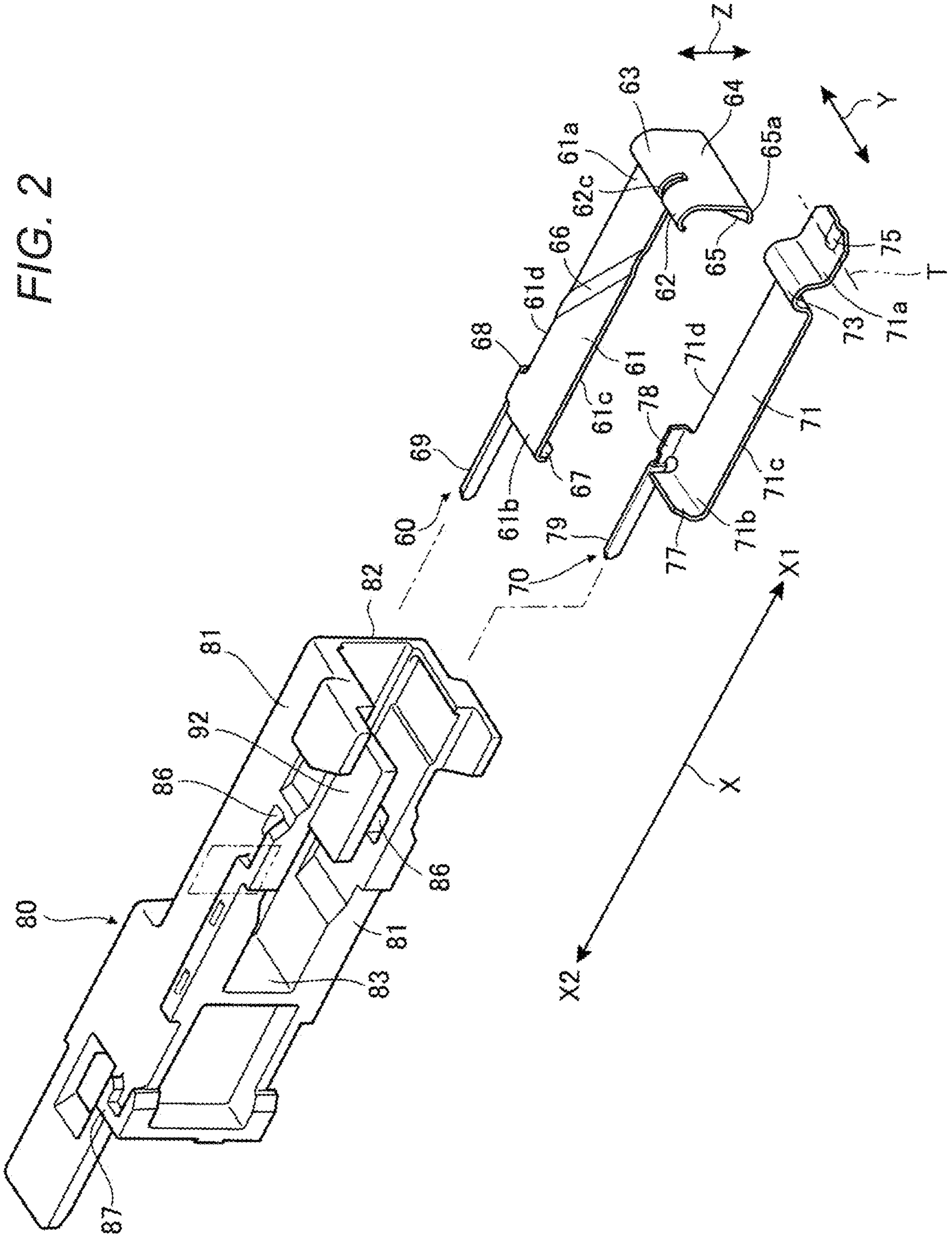
FIG. 2 is a perspective view of a pair of terminals and a terminal case constituting the terminal-equipped damper device.
Figure 7:
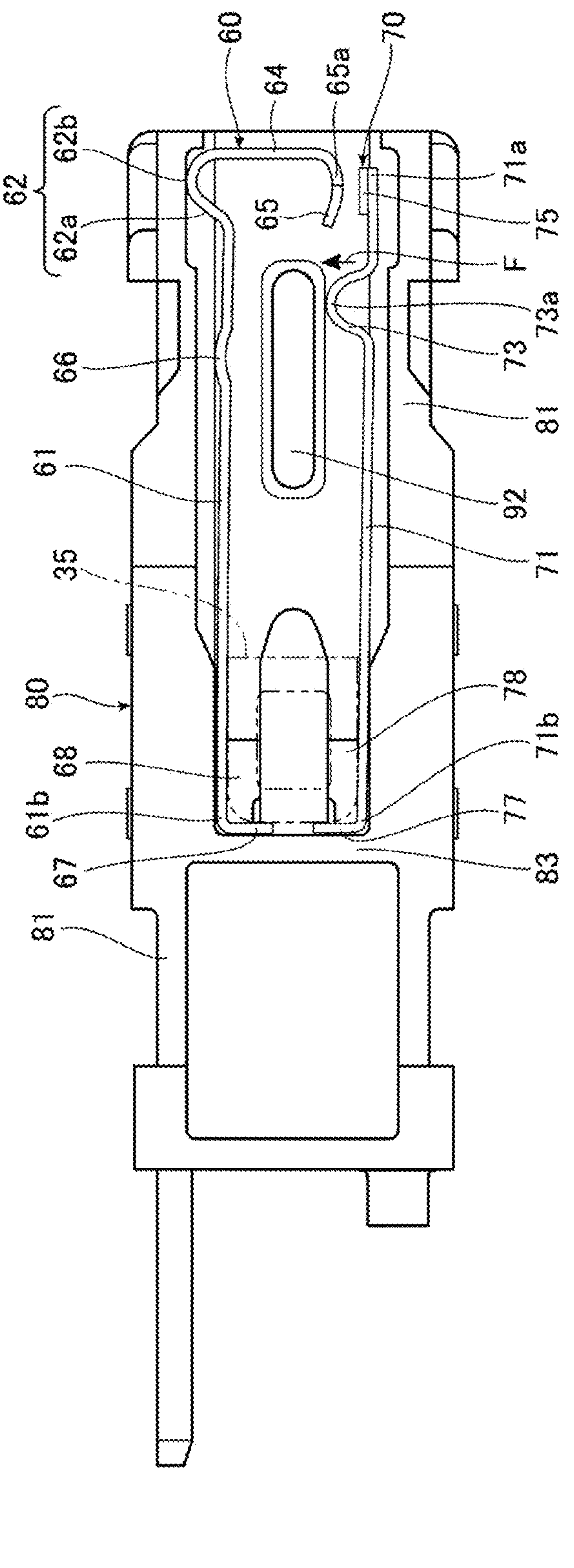
FIG. 7 is a side view of the pair of terminals and the terminal case accommodating and holding the pair of terminals.

As shown in FIGS. 1,2, 6 to 8, and the like, the first terminal 60 includes a first extending portion 61 having a base end supported by the main body case 20 and extending in the sliding direction X of the rod 40, a first contact portion (in the present embodiment, a base end portion 65*a* of a folded portion 65 to be described later) provided on a distal end portion 61*a* side of the first extending portion 61, and a receiving portion 62 pressed by the pressing portion 47. The first terminal 60 is disposed outside the main body case 20. As shown in FIGS. 2 and 7, the first terminal 60 is disposed to face the second terminal 70. Further, the first terminal 60 is bendable and deformable to approach or separate from the second terminal 70 disposed to face the first terminal 60.

Figure 9:
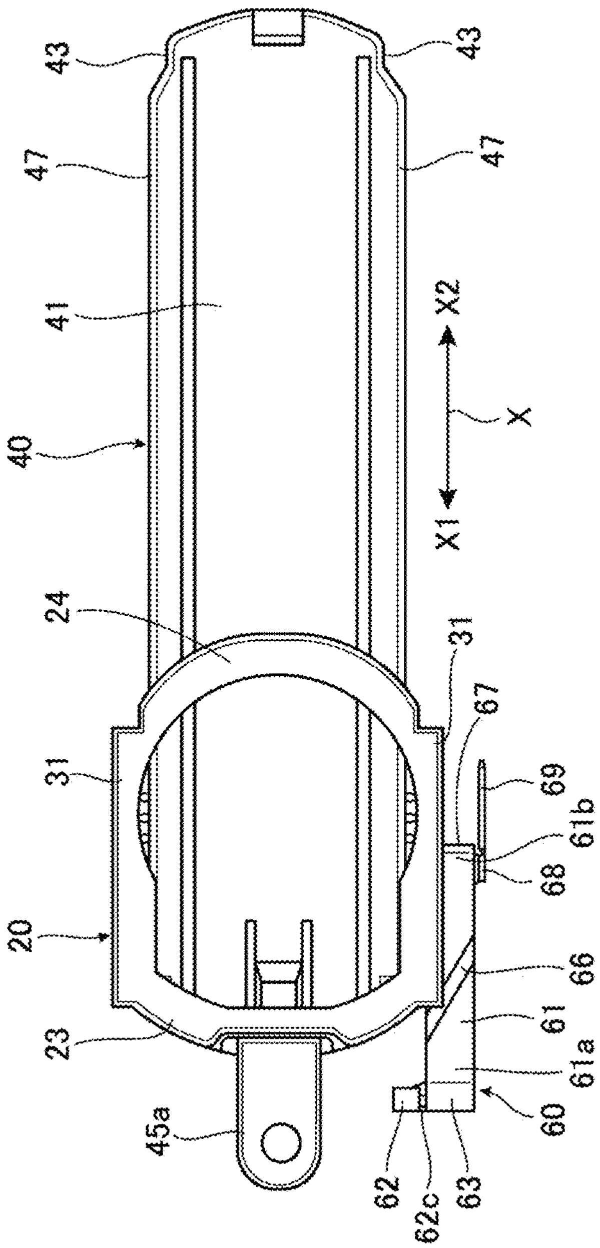
FIG. 9 is a plan view of the terminal-equipped damper device in a state where the terminal case is removed.

As shown in FIGS. 1 and 9, when the damper device 10 is viewed from a planar direction, the first extending portion 61 of the first terminal 60 has an elongated plate shape extending with a predetermined length and a constant width along the sliding direction X of the rod 40. As shown in FIG. 10B and FIG. 11B, when the receiving portion 62 is pressed by the pressing portion 47 of the rod 40, the first extending portion 61 of the first terminal 60 is mainly bent and deformed.

Figure 3:
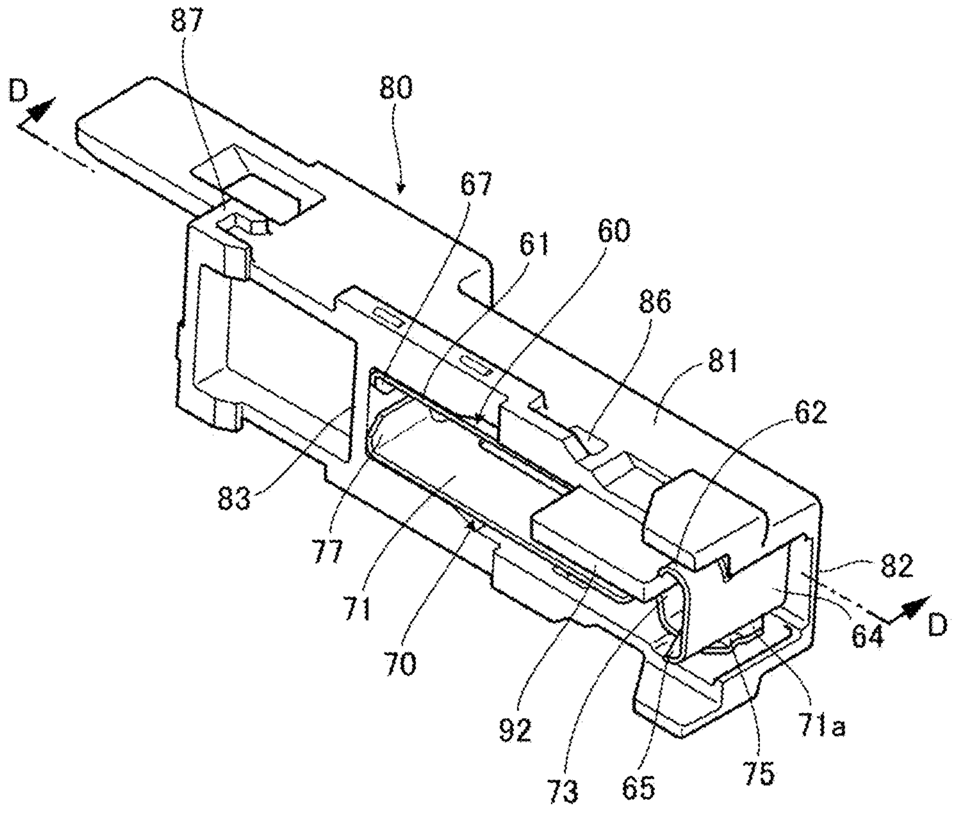
FIG. 3 is a perspective view showing a state where the pair of terminals are accommodated and held in the terminal case.

As shown in FIGS. 2 and 3, a bent portion 63 bent in a direction away from the second terminal 70 is provided on the distal end portion 61*a* (an end portion on a direction X1 side) side in an extending direction of the first extending portion 61. As shown in FIGS. 10A and 10B, the bent portion 63 according to this embodiment includes an inclined portion 63*a* extending obliquely outward to be away from the second terminal 70 from a most distal end of the distal end portion 61*a* of the first extending portion 61, and a top portion 63*b* having a curved surface shape and provided on a distal end side in an extending direction of the inclined portion 63*a*. A distal end of the top portion 63*b* has a shape facing the second terminal 70. It can be said that the bent portion 63 is bent to protrude toward the pressing portion 47 of the rod 40 as shown in (b) of FIG. 10B and (b) of FIG. 11B.

Further, the bent portion 63 has a portion protruding from one side in the width direction Y, and this portion forms the receiving portion 62 (see FIG. 2). That is, the receiving portion 62 protrudes in the width direction Y of the bent portion 63 from one side (a side close to the outer surface of the side wall 21 of the main body case 20) in the width direction Y of the bent portion 63 via a slit 62*c*. A protruding direction of the receiving portion 62 is orthogonal to the extending direction of the first extending portion 61 (see FIG. 9). That is, as shown in FIG. 9, when the first terminal 60 is viewed from a planar direction (when viewed from a direction orthogonal to a plane direction of the first extending portion 61), the distal end portion 61*a* side of the first terminal 60 is bent in a substantially L shape by the first extending portion 61 and the receiving portion 62 orthogonal to the first extending portion 61.

As shown in FIG. 7, similarly to the bent portion 63, the receiving portion 62 has a shape bent in a direction away from the second terminal 70, and includes an inclined portion 62*a* extending obliquely outward to be away from the second terminal 70, and a top portion 62*b* having a curved surface and provided at a distal end portion in an extending direction of the inclined portion 62*a*. A distal end of the top portion 62*b* has a shape facing the second terminal 70. Further, as shown in FIG. 6, in a state where the first terminal 60 is disposed outside the main body case 20, the receiving portion 62 protrudes inward from the one side wall 21 of the main body case 20 and is positioned to be aligned with the pressing portion 47 of the rod 40, and the pressing portion 47 and the receiving portion 62 are disposed to face each other.

As shown in FIG. 10B and FIG. 11B, when the rod 40 slides in the direction X1, the top portion 62*b* of the receiving portion 62 is pressed by the pressing portion 47. At this time, mainly, the first terminal 60 is bent and deformed with a base end portion 61*b* side in the extending direction of the first extending portion 61 as a fulcrum, and the first contact portion (the base end portion 65*a* of the folded portion 65) comes into contact with the second contact portion of the second terminal 70 (the protrusion 75 to be described later) (see (b) of FIG. 10B and (b) of FIG. 11B). Thus, when a pressing force from the pressing portion 47 is not applied from the state where the contact portions come into contact with each other, the first terminal 60 elastically returns to an original shape (see FIG. 10A and FIG. 11A).

As shown in FIG. 6, the receiving portion 62 is provided to overlap with the one side wall 21 of the main body case 20 when viewed from the sliding direction X of the rod 40. That is, in the state where the first terminal 60 is disposed outside the main body case 20, a part of the receiving portion 62 overlaps with the one side wall 21 of the main body case 20.

Further, an extension 64 extends from a distal end of the bent portion 63 toward a direction approaching the second terminal 70, and a distal end portion side of the extension 64 is folded to provide the folded portion 65. The folded portion 65 serves as a first contact portion and is configured to approach or separate from the protrusion 75 provided on the second terminal 70.

As shown in FIGS. 2 and 7, in this embodiment, the extension 64 extends from distal ends of the bent portion 63 and the receiving portion 62 (distal ends of the top portions 63*b*, 62*b*) in the direction approaching the second terminal 70 so as to intersect with (here, substantially orthogonal to) the first extending portion 61. In addition, as shown in FIG. 7, a distal end portion in an extending direction of the extension 64 is folded toward the base end portion 61*b* in the extending direction of the first extending portion 61 to provide the folded portion 65. Further, the folded portion 65 extends obliquely toward the base end portion 61*b* of the first extending portion 61 so as to approach an inner surface (a facing surface of the second terminal 70) of the first extending portion 61 in a thickness direction (see FIG. 7). As shown in FIG. 7, the base end portion 65*a* of the folded portion 65 has a curved surface, and the curved base end portion 65*a* serves as the first contact portion that comes into contact with the second contact portion of the second terminal 70.

A width (a length in the width direction Y) of the bent portion 63 including the receiving portion 62, the extension 64, and the folded portion 65 is wider than a width of the first extending portion 61.

Further, a bead portion 66 is provided to extend obliquely from a position closer to the base end portion 61*b* on another side 61*d* in the width direction Y of the first extending portion 61 toward a position on the distal end portion 61*a* side on one side 61*c* in the width direction Y.

That is, as shown in FIGS. 2 and 9, the bead portion 66 extends obliquely and linearly from a position closer to the base end portion 61*b* in the extending direction of the first extending portion 61 on another side 61*d* in the width direction Y of the first extending portion 61 (a side away from the outer surface of the side wall 21 of the main body case 20) toward a position on the distal end portion 61*a* side in the extending direction of the first extending portion 61 on one side 61*c* in the width direction Y of the first extending portion 61. As shown in FIG. 7, the bead portion 66 protrudes in a direction away from the second terminal 70 from an outer surface of the first extending portion 61 in a thickness direction (a surface opposite to a facing surface of the second terminal 70).

A first bending rib 67 bent toward the second terminal 70 is provided in the base end portion 61*b* (an end portion on the direction X2 side) in the extending direction of the first extending portion 61 from an end edge of the rod 40 in the same direction as the sliding direction X. As shown in FIG. 7, the first bending rib 67 is engaged with the terminal engaging protrusion 35 of the main body case 20 to suppress the first terminal 60 from coming off from the main body case 20.

Figure 8:
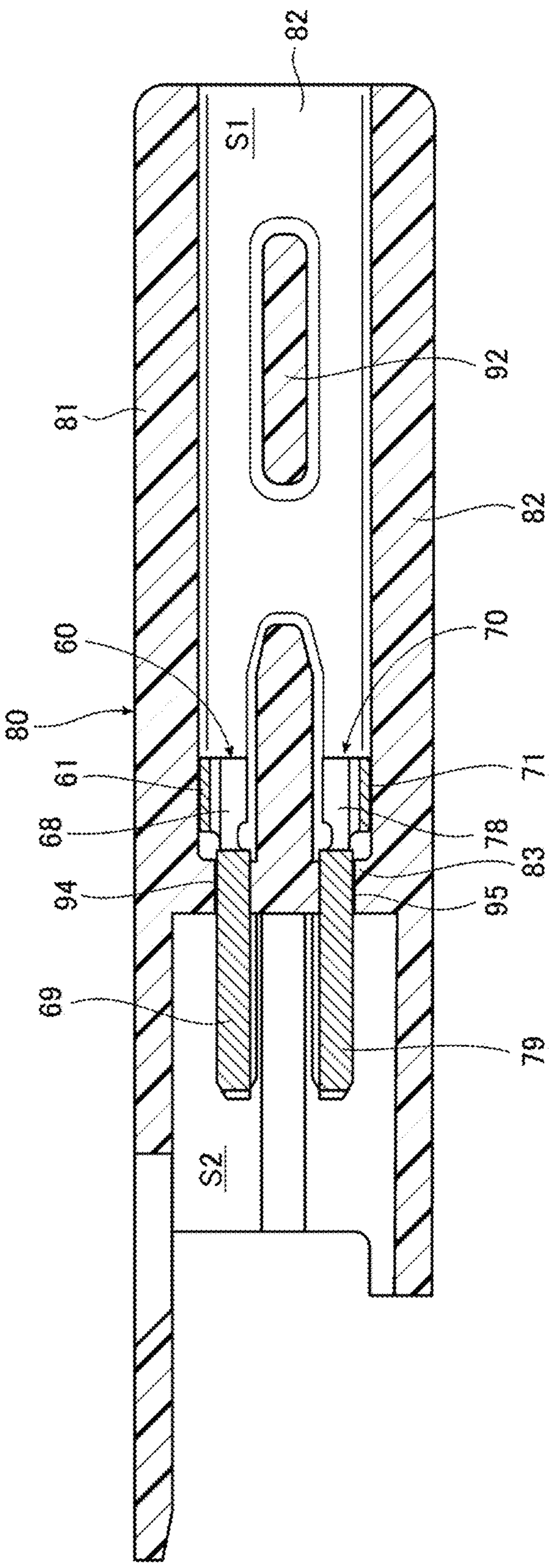
FIG. 8 is a cross-sectional view taken along a line D-D in FIG. 3.

Further, a second bending rib 68 bent toward the second terminal 70 is provided on the base end portion 61*b* in the extending direction of the first extending portion 61 from a side edge (a side edge on another side edge 61*d* side in the width direction Y) intersecting with the sliding direction X of the rod 40. A bus bar 69 extends along the sliding direction X of the rod 40 via the second bending rib 68. The bus bar 69 is electrically connected to an electric connector (not shown). As shown in FIG. 8, the bus bar 69 is inserted into a bus bar insertion hole 94 of the terminal case 80 and is inserted into a connector insertion space S2. The second bending rib 68 is contactable with an inner surface of the side wall 82 of the terminal case 80, and also serves as a guide when the bus bar 69 is inserted into the bus bar insertion hole 94.

As shown in FIG. 1, the first terminal 60 is disposed outside the main body case 20 such that the plane direction of the first extending portion 61 (a direction along a surface M of the first extending portion 61) intersects with (here, is orthogonal to) the outer surface of the side wall 21 of the main body case 20. Further, the first terminal 60 is disposed outside the main body case 20 such that the plane direction of the first extending portion 61 of the first terminal 60 is substantially parallel to a plane direction of the substrate 41 of the rod 40 (a direction along the surface M of the substrate 41).

In the first terminal 60 described above, in the case of this embodiment, all of the first extending portion 61, the receiving portion 62, the bent portion 63, the extension 64, the folded portion 65, the first bending rib 67, the second bending rib 68, the bus bar 69, and the like are integrally formed by appropriately bending metal plates made of metal materials such as an iron-based alloy such as spring steel or stainless steel, a copper alloy, or an aluminum alloy. The bus bar 69 has a shape in which a metal plate is folded and overlapped, and is thicker than other portions of the first extending portion 61 or the like.

Next, the second terminal 70 will be described.

As shown in FIGS. 1,2, 6 to 8, and the like, the second terminal 70 includes a second extending portion 71 having a base end supported by the main body case 20 and extending in the sliding direction X of the rod 40, and a second contact portion (in the present embodiment, a protrusion 75 to be described later) provided on a distal end portion side of the second extending portion 71 and coming into contact with a first contact portion (the base end portion 65*a* of the folded portion 65) when the receiving portion 62 is pressed by the pressing portion 47. The second terminal 70 is disposed outside the main body case 20 and disposed to face the first terminal 60. Further, the second terminal 70 is bendable and deformable to approach or separate from the first terminal 60 disposed to face the second terminal 70.

As shown in FIG. 1, the second extending portion 71 of the second terminal 70 has an elongated plate shape extending with a predetermined length and a constant width along the sliding direction X of the rod 40. As shown in FIG. 10B and FIG. 11B, when the receiving portion 62 is pressed by the pressing portion 47 of the rod 40, the first extending portion 61 is bent and deformed, and when the first contact portion of the first terminal 60 comes into contact with the second contact portion of the second terminal 70, the second terminal 70 indirectly receives the pressing force from the pressing portion 47 of the rod 40 via the first terminal 60. Therefore, the second extending portion 71 of the second terminal 70 is bent and deformed (see FIG. 10B and FIG. 11B).

In addition, a bent portion 73 that is bent in a direction approaching the first terminal 60 is provided at a position slightly closer to a base end portion (an end portion on the X2 direction side) than a distal end portion (an end portion on the X1 direction side) in an extending direction of the second extending portion 71. The bent portion 73 includes a top portion 73*a* having a curved surface. The second terminal 70 is disposed outside the main body case 20 in a state where the top portion 73*a* of the bent portion 73 is elastically in contact with a positioning rib 92 of the terminal case 80 and the second extending portion 71 is slightly bent and deformed in a direction away from the first extending portion 61 (see FIG. 7). As a result, the second terminal 70 is elastically biased in a direction indicated by an arrow F in FIG. 7. However, even in this state, since the top portion 73*a* of the bent portion 73 is in contact with the positioning rib 92, the second extending portion 71 is restricted from approaching the first terminal 60 anymore, and the protrusion 75 serving as a second contact portion and the base end portion 65*a* of the folded portion 65 serving as a first contact portion are maintained in a state of being separated from each other.

Further, as shown in FIG. 6, the protrusion 75 that protrudes from a position displaced in the width direction Y (a position close to one side 71*c* in the width direction Y of the second extending portion 71) toward a direction approaching the first terminal 60 is provided at a distal end portion 71*a* in the extending direction of the second extending portion 71 to approach the receiving portion 62 of the first terminal 60, and the protrusion 75 serves as a second contact portion.

As shown in FIG. 6, the protrusion 75 according to this embodiment protrudes from an inner surface (a facing surface of the first terminal 60) of the distal end portion 71*a* of the second extending portion 71 in a thickness direction toward a direction approaching the first terminal 60, and a protruded surface thereof is curved. As shown in FIG. 2, the protrusion 75 extends a predetermined length along the extending direction of the second extending portion 71. As a result, the protrusion 75 serving as a second contact portion comes into contact with the base end portion 65*a* of the wide folded portion 65 extending in the width direction Y of the first terminal 60 so as to intersect with the folded portion 65. In FIG. 2, a contact trajectory T of the base end portion 65*a* of the folded portion 65 with respect to the protrusion 75 is shown, but in the case of this embodiment, the base end portion 65*a* of the folded portion 65 is in line contact with the protrusion 75 so as to intersect with the protrusion 75 in a substantially cross shape, or in a manner close to line contact.

In addition, a first bending rib 77 that is bent toward the first terminal 60 is provided on the base end portion 71*b* (an end portion on the direction X2 side) in the extending direction of the second extending portion 71 from an end edge of the rod 40 in the same direction as the sliding direction X. As shown in FIG. 7, the first bending rib 77 is engaged with the terminal engaging protrusion 35 of the main body case 20 to suppress the second terminal 70 from coming off from the main body case 20.

Further, a second bending rib 78 bent toward the first terminal 60 is provided in the base end portion 71*b* in the extending direction of the second extending portion 71 from a side edge (a side edge on another side edge 71*d* side in the width direction Y) intersecting with the sliding direction X of the rod 40. A bus bar 79 extends along the sliding direction X of the rod 40 via the second bending rib 78. The bus bar 79 is electrically connected to an electric connector (not shown). As shown in FIG. 8, the bus bar 79 is inserted into a bus bar insertion hole 95 of the terminal case 80 and is inserted into the connector insertion space S2. The second bending rib 78 is contactable with the inner surface of the side wall 82 of the terminal case 80, and also serves as a guide when the bus bar 79 is inserted into the bus bar insertion hole 95.

As shown in FIG. 1, the second terminal 70 is disposed outside the main body case 20 such that a plane direction of the second extending portion 71 (a direction along a surface M of the second extending portion 71) intersects with (here, is orthogonal to) the outer surface of the side wall 21 of the main body case 20. Further, the second terminal 70 is disposed outside the main body case 20 such that the plane direction of the second extending portion 71 of the second terminal 70 is parallel to the plane direction of the substrate 41 of the rod 40.

In the second terminal 70 described above, in the case of this embodiment, all of the second extending portion 71, the bent portion 73, the protrusion 75, the first bending rib 77, the second bending rib 78, the bus bar 79, and the like are integrally formed by appropriately bending metal plates made of metal materials such as an iron-based alloy such as spring steel or stainless steel, a copper alloy, or an aluminum alloy. The bus bar 79 has a shape in which a metal plate is folded and overlapped, and is thicker than other portions of the second extending portion 71 or the like.

In this embodiment, as shown in FIG. 12, when the rod 40 slides in the direction X1 and a braking force is applied to the rod 40, as shown in FIG. 10B and FIG. 11B, the pressing portion 47 of the rod 40 presses the top portion 62*b* of the receiving portion 62 of the first terminal 60 to bend and deform the first extending portion 61, and the base end portion 65a of the folded portion 65 serving as a first contact portion is brought into contact with the protrusion 75 serving as the second contact portion of the second terminal 70, so that the two terminals 60, 70 are electrically conducted. At this time, the second extending portion 71 of the second terminal 70 is bent and deformed against an elastic biasing force (see an arrow F in FIG. 7) as shown in FIG. 10B and FIG. 11B (the second extending portion 71 is bent and deformed such that the bent portion 73 is separated from the positioning rib 92 of the terminal case 80).

On the other hand, as shown in FIG. 13, when the rod 40 slides in the direction X2 and the braking force applied to the rod 40 is released, as shown in FIG. 10A and FIG. 11A, the pressing portion 47 of the rod 40 is retracted from the receiving portion 62 of the first terminal 60 to a position where the pressing portion 47 does not come into contact with the receiving portion 62 of the first terminal 60 so as not to press the first terminal 60. Therefore, the first extending portion 61 elastically returns to an original shape, and the base end portion 65*a* of the folded portion 65 serving as a first contact portion is separated from the protrusion 75 serving as the second contact portion of the second terminal 70, and the two terminals 60, 70 are not electrically conducted. In addition, the second extending portion 71 of the second terminal 70 elastically returns, as shown in (a) of FIG. 10A, the top portion 73*a* of the bent portion 73 comes into contact with the positioning rib 92 of the terminal case 80, the second extending portion 71 is restricted from approaching the first terminal 60, and the protrusion 75 and the base end portion 65*a* of the folded portion 65 are maintained in a separated state.

Next, the terminal case 80 will be described.

As shown in FIGS. 1 to 4 and 5, the terminal case 80 according to this embodiment includes a pair of facing walls 81, 81 that are disposed to face each other to be parallel to each other and that extend along the sliding direction X of the rod 40 and the side wall 82 that connects the other side edges (side edges separated from the outer surface of the side wall 21 of the main body case 20) of the pair of facing walls 81, 81 in the width direction Y, and the terminal case 80 has a case shape. As shown in FIG. 2, a partition wall 83 is disposed at a position slightly closer to the base end portion than an intermediate portion of the pair of facing walls 81, 81 and the side wall 82 in an extending direction. The terminal accommodating space S1 in which the pair of terminals 60, 70 are accommodated and disposed and the connector insertion space S2 into which an electric connector (not shown) electrically conducted to the pair of terminals 60, 70 is inserted are defined inside the terminal case 80 via the partition wall 83 (see FIG. 8).

As shown in FIGS. 1 and 2, a first engaging portion 86 having a through hole shape with which the first engaging portion 32 of the main body case 20 is engaged is provided at one side edge portion in the width direction Y (side edge portion approaching the outer surface of the side wall 21 of the main body case 20), which is a position slightly closer to a base end portion than a distal end portion in an extending direction of each of the facing walls 81. Further, a second engaging portion 87 having a substantially U-shaped frame shape with which the second engaging portion 33 of the main body case 20 is engaged is provided at one side edge portion in the width direction Y, which is at the base end portion in the extending direction of each of the facing walls 81.

Further, as shown in FIGS. 2 and 7, a positioning rib 92, which is inserted into the positioning groove 37 of the main body case 20, protrudes from an inner surface (a facing surface of the outer surface of the side wall 21 of the main body case 20) of a distal end portion side in the extending direction of the side wall 82 and at an intermediate position in the height direction Z.

As shown in FIG. 8, the partition wall 83 is formed with a bus bar insertion hole 94 through which the bus bar 69 of the first terminal 60 is inserted and a bus bar insertion hole 95 through which the bus bar 79 of the second terminal 70 is inserted.

As shown in FIG. 8, the bus bars 69, 79 of the two terminals 60, 70 are inserted into the bus bar insertion holes 94 and 95 of the partition wall 83, and the bus bars 69, 79 are inserted into the connector insertion space S2, so that the pair of terminals 60, 70 are temporarily held in the terminal accommodating space SL. In this state, the first engaging portion 32 and the second engaging portion 33 of the main body case 20 are respectively engaged with the first engaging portion 86 and the second engaging portion 87 of each of the facing walls 81, so that the terminal case 80 is attached to an outside of the side wall 21 of the main body case 20 as shown in FIG. 4. At this time, as shown in FIG. 7, the terminal engaging protrusion 35 of the main body case 20 is engaged with the first bending ribs 67, 77 of the two terminals 60, 70, and the first bending ribs 67, 77 are sandwiched between the partition wall 83 and the terminal engaging protrusion 35. Therefore, the two terminals 60, 70 are retained in the terminal case 80 so that the two terminals 60, 70 are not detached from the terminal case 80.

(Modification)

Shapes and structures of the main body case, the rod, the damper structure body, the first terminal, the second terminal, and the terminal case constituting the terminal-equipped damper device according to the present invention are not limited to the above-described aspects.

The main body case 20 according to this embodiment includes the slots 23*a*, 24*a* provided in both directions X1, X2 in the sliding direction X of the rod 40 and has a thin case shape in which a ceiling side of the main body case 20 is open. For example, the main body case may have a cylindrical or rectangular cylindrical case shape. Although the rod 40 according to this embodiment has a thin flat shape, for example, the rod may have a cylindrical shape or a rectangular cylindrical shape.

Furthermore, the damper structure according to this embodiment is a so-called gear damper that includes the damper structure body 50 including a plurality of gears and the like and the rack gear 43*a* provided on the rod 40 and uses the viscous fluid R. However, for example, the damper structure may be an air damper that uses air, or a damper (a friction damper) that uses a frictional force, and it is sufficient that a braking force can be applied to the rod. In this embodiment, the braking force is applied when the rod 40 slides in the direction X1, and the braking force is released when the rod 40 slides in the direction X2. Alternatively, the braking force may be applied when the rod slides in the direction X2, and the braking force may be released when the rod slides in the direction X1.

In addition, the first terminal 60 includes the bent portion 63, the extension 64, the folded portion 65, and the bead portion 66. Alternatively, the bent portion 63, the extended portion 64, the folded portion 65, and the bead portion 66 may be omitted, and the first terminal 60 may have a shape and a structure including at least the first extending portion, the first contact portion, and the receiving portion. Further, the second terminal 70 includes the bent portion 73 and the protrusion 75. Alternatively, the bent portion 73 and the protrusion 75 may be omitted, and the second terminal 70 may have a shape and a structure including at least the second extending portion and the second contact portion.

Although the first extending portion 61 of the first terminal 60 and the second extending portion 71 of the second terminal 70 according to this embodiment have an elongated plate shape extending with a constant width, the first extending portion or the second extending portion may be, for example, narrower or wider from the base end portion toward the distal end portion, narrower or wider from the base end portion toward the distal end portion in a stepwise manner, or have a narrow linear shape. The first extending portion and the second extending portion are preferably bendable and deformable.

Although the two terminals 60, 70 are accommodated and held in the terminal accommodating space S1 of the terminal case 80, the terminal case 80 may not be provided. For example, a plurality of locking claws may be protruded from the outside of the main body case 20, and the plurality of locking claws may be locked at predetermined positions of the two terminals 60, 70 so that the two terminals 60, 70 are disposed to face each other outside the main body case 20.

Further, in this embodiment, as shown in FIG. 4, the pair of terminals 60, 70 are disposed to face each other outside the one side wall 21 of the main body case 20 via the terminal case 80. Alternatively, the pair of terminals 60, 70 may be disposed to face each other outside another side wall 21 of the main body case 20, or the pair of terminals 60, 70 may be disposed to face each other outside both side walls 21, 21 of the main body case 20.

Operations and Effects

Next, operations and effects of the damper device 10 configured as described above will be described.

In the damper device 10, in a state where the opening and closing body 3 is closed with respect to the opening of the fixing body 1, as shown in FIG. 12, the rod 40 is drawn from the slot 23*a* of the main body case 20, and as shown in FIG. 10A and (a) of FIG. 11A, the pressing portion 47 of the rod 40 does not come into contact with the receiving portion 62 of the first terminal 60. In this state, the first terminal 60 is not pressed by the pressing portion 47 of the rod 40, and the base end portion 65*a* of the folded portion 65 serving as a first contact portion is separated from the protrusion 75 serving as a second contact portion of the second terminal 70, so that the two terminals 60, 70 are not conducted.

When the opening and closing body 3 is opened from the opening of the fixing body 1, the rod 40 is pulled via the mounting piece 45a and slides in the direction X1. As a result, when a braking force is applied to the rod 40 by the damper structure including the damper structure body 50 and the rack gear 43*a*, as shown in FIG. 10B and FIG. 11B, the pressing portion 47 of the rod 40 presses the top portion 62*b* of the receiving portion 62 of the first terminal 60 to bend and deform the first extending portion 61. As a result, since the base end portion 65*a* of the folded portion 65 serving as a first contact portion is in contact with the protrusion 75 of the second terminal 70 serving as a second contact portion, the two terminals 60, 70 are electrically conducted, and a lamp (not shown) disposed in the fixing body 1 is turned on.

On the other hand, when the opening and closing body 3 is pushed in from a state where the opening and closing body 3 is opened from the opening of the fixing body 1 to close the opening of the fixing body 1, the rod 40 is pushed in via the mounting piece 45*a* and slides in the direction X2. In this case, since the braking force by the damper structure is released, the rod 40 is smoothly pushed in. As shown in FIG. 10A and FIG. 11A, the pressing portion 47 of the rod 40 is retracted from the receiving portion 62 of the first terminal 60 to a position where the pressing portion 47 does not come into contact with the receiving portion 62, and the pressing portion 47 does not press the first terminal 60. Therefore, the first extending portion 61 elastically returns to the original shape, and the base end portion 65a of the folded portion 65 serving as a first contact portion is separated from the protrusion 75 serving as a second contact portion of the second terminal 70. As a result, the two terminals 60, 70 are not electrically conducted, and a lamp (not shown) disposed in the fixing body 1 is turned off.

In the damper device 10, as shown in FIGS. 1 and 9, the first extending portion 61 of the first terminal 60 and the second extending portion 71 of the second terminal 70 extend in the sliding direction X of the rod 40. Therefore, the damper device 10 can be suppressed from being bulky in a direction intersecting with the sliding direction X of the rod 40 and facing outward of the main body case 20. As a result, the damper device 10 can be made compact. Since the first extending portion 61 of the first terminal 60 and the second extending portion 71 of the second terminal 70 can be ensured to be long, the flexibility and durability of the extending portions 61, 71 can be enhanced, and the extending portions 61, 71 can be made less likely to sink.

In addition, in this embodiment, as shown in FIGS. 2 and 3, the bent portion 63 bent in a direction away from the second terminal 70 is provided on the distal end portion 61*a* side of the first extending portion 61, the bent portion 63 includes a portion protruding from one side in the width direction Y of the bent portion 63, and this portion forms the receiving portion 62.

According to the above aspect, since the receiving portion 62 can be provided while securing a wide width of the bent portion 63, the receiving portion 62 can be easily pressed by the pressing portion 47 of the rod 40.

Further, in this embodiment, as shown in FIG. 1, the main body case 20 includes the pair of side walls 21, 21 and the pair of connection walls 23, 24 that connect the pair of side walls 21, 21 to each other, the first terminal 60 and the second terminal 70 are disposed outside the one side wall 21 at least, and as shown in FIG. 6, the receiving portion 62 is provided to overlap with the one side wall 21 of the main body case 20 when viewed from the sliding direction X of the rod 40.

According to the above aspect, as shown in FIG. 6, since the receiving portion 62 of the first terminal 60 is provided to overlap with the one side wall 21 of the main body case 20 when viewed in the sliding direction X of the rod 40, the damper device 10 can be further suppressed from being bulky in a direction intersecting with the sliding direction X of the rod 40 and facing outward of the main body case 20. As a result, the damper device 10 can be made even more compact.

In this embodiment, as shown in FIG. 6, the protrusion 75 that protrudes from a position displaced in the width direction Y toward a direction approaching the first terminal 60 is provided at the distal end portion 71*a* of the second extending portion 71 to approach the receiving portion 62, and the protrusion 75 serves as a second contact portion.

In the case of this embodiment, as described above, since the receiving portion 62 protrudes from one side in the width direction Y of the bent portion 63 located on the distal end portion 61*a* side of the first extending portion 61, when the receiving portion 62 of the first terminal 60 is pressed by the pressing portion 47 of the rod 40, one side portion 62*d* in the width direction Y of the receiving portion 62 may be inclined toward the second terminal 70 with respect to another side portion 62*e* in the width direction Y as indicated by the two-dot chain line in FIG. 6. On the other hand, according to the above aspect, even when the receiving portion 62 is inclined as described above, the protrusion 75 protruding in the direction approaching the first terminal 60 is present at a position approaching the receiving portion 62 and displaced in the width direction Y. and thus the receiving portion 62 can be easily brought into contact with the protrusion 75, and the two terminals 60, 70 can be more reliably electrically conducted.

Further, in this embodiment, as shown in FIGS. 2 and 6, the first terminal 60 is provided with the extension 64 extending from a distal end of the bent portion 63 toward the direction approaching the second terminal 70, the distal end portion side of the extension 64 is folded to provide the folded portion 65, and the folded portion 65 serves as a first contact portion and is configured to approach or separate from the protrusion 75.

According to the above aspect, the folded portion 65 formed by folding the distal end side of the extension 64 serves as a first contact portion, and the folded portion 65 approaches or separates from the protrusion 75 serving as a second contact portion. Therefore, at the time of the contact, the folded portion 65 and the protrusion 75 are brought into contact with each other to intersect with each other (see the contact trajectory T of the base end portion 65*a* of the folded portion 65 with respect to the protrusion 75 in FIG. 2), and the two terminals 60, 70 can be more reliably electrically conducted. That is, since the wide folded portion 65 comes into contact with the protrusion 75 to intersect with the protrusion 75, even when the folded portion 65 serving as a first contact portion is inclined obliquely, the folded portion 65 can be reliably brought into contact with the protrusion 75.

In this embodiment, as shown in FIGS. 1 and 2, the bead portion 66 is provided to extend obliquely from a position closer to the base end portion 61*b* on another side 61*d* in the width direction Y of the first extending portion 61 toward a position on the distal end portion 61*a* side on one side 61*c* in the width direction Y.

According to the above aspect, the rigidity of the first extending portion 61 of the first terminal 60 can be increased by the bead portion 66. Accordingly, when the receiving portion 62 of the first terminal 60 is pressed by the pressing portion 47 of the rod 40, the first extending portion 61 is less likely to be twisted and the receiving portion 62 is less likely to be inclined. As a result, the first contact portion of the first terminal 60 can be firmly brought into contact with the second contact portion of the second terminal 70, and the terminals 60, 70 are reliably electrically conducted.

The present invention is not limited to the embodiments described above, and various modifications are possible within the scope of the gist of the present invention, and such embodiments are also included in the scope of the present invention.

REFERENCE SIGNS LIST

10: terminal-equipped damper device (damper device)
20: main body case (case)
21: side wall
23, 24: connection wall
40: rod
47: pressing portion
50: damper structure body
60: first terminal
61: first extending portion
62: receiving portion
63: bent portion
64: extension
65: folded portion
66: bead portion
70: second terminal
71: second extending portion
73: bent portion
75: protrusion
80: terminal case

The invention claimed is:

1. A terminal-equipped damper device having a first terminal and a second terminal that are configured to approach or separate from each other, the terminal-equipped damper device comprising:

a case;

a rod slidably held by the case; and a damper structure configured to apply a braking force to the rod, wherein the rod includes a pressing portion that is configured to press the first terminal and configured to bring the first terminal into contact with the second terminal depending on a slide position of the rod, the first terminal includes a first extending portion having a base end supported by the case and extending in a sliding direction of the rod, a first contact portion provided on a distal end portion side of the first extending portion, and a receiving portion configured to be pressed by the pressing portion, and the first terminal is disposed outside the case, and the second terminal includes a second extending portion having a base end supported by the case and extending in the sliding direction of the rod, and a second contact portion provided on a distal end portion side of the second extending portion and coming into contact with the first contact portion when the receiving portion is pressed by the pressing portion, and the second terminal is disposed outside the case and disposed to face the first terminal.

2. The terminal-equipped damper device according to claim 1, wherein bent portion bent in a direction away from the second terminal is provided on the distal end portion side of the first extending portion, the bent portion includes a portion protruding from one side in a width direction of the bent portion, and the portion forms the receiving portion.

3. The terminal-equipped damper device according to claim 2, wherein the case includes a pair of side walls and a pair of connection walls connecting the pair of side walls, the first terminal and the second terminal are disposed outside at least one of the side walls, and the receiving portion is provided to overlap with one of the side walls of the case when viewed from the sliding direction of the rod.

4. The terminal-equipped damper device according to claim 2, wherein a protrusion that protrudes from a position displaced in a width direction toward a direction approaching the first terminal is provided at a distal end portion of the second extending portion to approach the receiving portion, and the protrusion is configured to serve as the second contact portion.

5. The terminal-equipped damper device according to claim 4, wherein the first terminal is provided with an extension extending from a distal end of the bent portion toward a direction approaching the second terminal, a distal end portion side of the extension is folded to provide a folded portion, and the folded portion is configured to serve as the first contact portion and is configured to approach or separate from the protrusion.

6. The terminal-equipped damper device according to claim 1, wherein a bead portion extending obliquely from a position near a base end portion on another side in a width direction of the first extending portion toward a position on a distal end portion side on one side in the width direction is provided.

* * * * *